United States Patent
Matsumoto

(10) Patent No.: US 9,904,006 B2
(45) Date of Patent: Feb. 27, 2018

(54) LIGHT SOURCE DEVICE AND DISPLAY APPARATUS THAT ALLOWS FOR ENTRY OF A THERMALLY EXPANDED LIGHT GUIDE PLATE

(71) Applicant: Sakai Display Products Corporation, Sakai-shi, Osaka (JP)

(72) Inventor: Kouji Matsumoto, Sakai (JP)

(73) Assignee: SAKAI DISPLAY PRODUCTS CORPORATION, Osaka (JP)

( * ) Notice: Subject to any disclaimer, the term of this patent is extended or adjusted under 35 U.S.C. 154(b) by 0 days.

(21) Appl. No.: 15/305,559

(22) PCT Filed: Jul. 24, 2014

(86) PCT No.: PCT/JP2014/069588
§ 371 (c)(1),
(2) Date: Oct. 20, 2016

(87) PCT Pub. No.: WO2016/013083
PCT Pub. Date: Jan. 28, 2016

(65) Prior Publication Data
US 2017/0038526 A1     Feb. 9, 2017

(51) Int. Cl.
*F21V 8/00*     (2006.01)

(52) U.S. Cl.
CPC ......... *G02B 6/0093* (2013.01); *G02B 6/0031* (2013.01); *G02B 6/0051* (2013.01); *G02B 6/0088* (2013.01)

(58) Field of Classification Search
CPC .. G02B 6/0093; G02B 6/0031; G02B 6/0088; G02B 6/0051
See application file for complete search history.

(56) References Cited

U.S. PATENT DOCUMENTS

2007/0008449 A1    1/2007  Choi

FOREIGN PATENT DOCUMENTS

| JP | 2005-285714 A | 10/2005 |
| JP | 2007-19021 A | 1/2007 |
| JP | 2011-233240 A | 11/2011 |
| JP | 2012-160397 A | 8/2012 |
| JP | 2013-114982 A | 6/2013 |
| JP | 2013-157306 A | 8/2013 |

OTHER PUBLICATIONS

Translated international search report.*

* cited by examiner

*Primary Examiner* — Tracie Y Green
(74) *Attorney, Agent, or Firm* — Rudy J. Ng; Bret E. Field; Bozicevic, Field & Francis LLP

(57) ABSTRACT

A light source device according to an aspect of the present disclosure comprises a light source, a plate-shaped optical member configured to emit light emitted by the light source from one surface of the optical member, and a support part configured to support the optical member. In the light source device, one portion of a peripheral edge part of the optical member is fixed to the support part, and the other portion of the peripheral edge part of the optical member are not fixed to the support part.

7 Claims, 7 Drawing Sheets

LIGHT SOURCE DEVICE AND DISPLAY APPARATUS THAT ALLOWS FOR ENTRY OF A THERMALLY EXPANDED LIGHT GUIDE PLATE

CROSS-REFERENCE TO RELATED APPLICATIONS

This application is the national phase under 35 U.S.C. § 371 of PCT International Application No. PCT/JP2014/069588 which has an International filing date of Jul. 24, 2014 and designated the United States of America.

FIELD

The present invention relates to a light source device and a display apparatus, in which light emitted by light sources is emitted from one surface of an optical member.

BACKGROUND

A liquid crystal display apparatus includes a liquid crystal display panel and a light source device (see Japanese Patent Laid-open Publication No. 2007-19021, which is hereinafter referred to as Patent Document 1).

Hereinafter, a case in which the liquid crystal display panel is arranged in a vertical position will be described.

Conventionally, an edge light type light source device has been proposed. The edge light type light source device includes a rectangular light guide plate arranged in a vertical position on a back side of the liquid crystal display panel, and light sources disposed to face a lower end face of the light guide plate.

Light emitted by the light sources is made incident inside of the light guide plate from the lower end face of the light guide plate, and further, is emitted to a front side of the light guide plate from a front surface of the light guide plate. As a result, the liquid crystal display panel is illuminated from the back side thereof.

A light guide plate of a first embodiment described in Patent Document 1 has a rectangular main body and an extension fixing part which protrudes to right and left sides from a vertical central part in right and left side parts of the main body. The extension fixing part is fitted to a fixing groove provided in a housing body for housing the light guide plate. Briefly, the light guide plate is configured so that the vertical central part in right and left side parts is fixed to the housing body.

A light guide plate of a second embodiment described in Patent Document 1 is provided with L-shaped notches at four corners. A protrusion which protrudes on the housing body for housing the light guide plate is inserted into each notch. Briefly, the light guide plate is placed on two protrusions of a lower side.

SUMMARY

When heat emitted by the light sources is transmitted to the light guide plate, the light guide plate is thermally expanded.

In a case of the light guide plate of the first embodiment described in Patent Document 1, since the vertical central part thereof is fixed, the light guide plate is thermally expanded toward upper and lower sides. Therefore, both of upper and lower sides of the light guide plate require voids to allow entry of the thermally expanded light guide plate.

In a case of the light guide plate of the second embodiment described in Patent Document 1, since the lower part thereof is placed on the protrusions, the light guide plate is thermally expanded toward the upper side. Therefore, the upper side of the light guide plate requires a void to allow entry of the thermally expanded light guide plate.

However, in a case of a common liquid crystal display apparatus, the lower side of the light guide plate has a spatial margin which is more than the upper side thereof. The reason is that, the lower part of the liquid crystal display apparatus is often provided with a reception substrate for receiving a signal transmitted from a remote controller therein, speakers disposed therein, or a logo of a manufacturer or a product name, etc. described thereon.

Accordingly, when the void to allow entry of the thermally expanded light guide plate is provided in the lower side of the light guide plate, it is possible to more reduce a size of the liquid crystal display apparatus than the case of providing the void in the upper side of the light guide plate.

In consideration of the above-mentioned circumstances, it is a major object of the present disclosure to provide a light source device and a display apparatus, which are capable of reducing a size thereof.

A light source device according to an aspect of the present disclosure comprises a light source, a plate-shaped optical member configured to emit light emitted by the light source from one surface of the optical member, and a support part configured to support the optical member. In the light source device, one portion of a peripheral edge part of the optical member is fixed to the support part, and the other portion of the peripheral edge part of the optical member are not fixed to the support part.

In the light source device according to another aspect the present disclosure, the support part is provided with a screw hole having a female thread. In the light source device, the one portion of the peripheral edge part is provided with a through hole or a notch-shaped concave part. The light source device further comprises a screw whose shank part having a male thread is inserted into the through hole or the concave part, such that the male thread and the female thread are screwed with each other to hold the optical member between a head part of the screw and the support part.

In the light source device according to another aspect the present disclosure, a buffer part is disposed between the head part and the optical member.

In the light source device according to another aspect the present disclosure, the optical member is a rectangular light guide plate or a diffusion plate arranged in a vertical position. In the light source device, an upper side part, or upper parts of right and left side parts of the optical member are fixed to the support part. In the light source device, a lower side part, and at least vertical central parts and lower parts of the right and left side parts of the optical member are not fixed to the support part.

A display apparatus according to an aspect of the present disclosure comprises the light source device according to an aspect of the present disclosure and a display panel which is illuminated by the light source device from a back side of the display panel.

According to an aspect of the present disclosure, since the one portion of the peripheral edge part of the optical member is fixed to the support part, and the other portion thereof is not fixed, it is difficult for the optical member to be thermally expanded in a direction in which the one portion of the peripheral edge part is separated from the other portion, and it is likely to be thermally expanded in a direction in which the other portion of the peripheral edge part is separated from the one portion.

Therefore, in the light source device (or the display apparatus including the light source device), a void in which the thermally expanded optical member enters may be provided near the other portion of the peripheral edge part of the optical member. In other words, it is not necessary to provide the void in which the thermally expanded optical member enters near the one portion of the peripheral edge part of the optical member.

Generally, since one portion/the other portion of the light source device (or the display apparatus including the light source device) has a relatively small/large spatial margin, it is designed to be tight/loose. Accordingly, if arranging the one portion/the other portion of the peripheral edge part of the optical member at the portion having a relatively small/large spatial margin in the light source device (or the display apparatus including the light source device), the light source device (or the display apparatus including the light source device) may be easily reduced in a size thereof.

According to another aspect the present disclosure, the optical member is held between the head part of the screw and the support part, thereby achieving a simple configuration.

According to another aspect the present disclosure, since the buffer part is disposed between the head part of the screw and the optical member, damage or breakage of the optical member due to a direct contact between the screw and the optical member, an occurrence of fragments caused by the breakage of the optical member, or the like is suppressed.

According to another aspect the present disclosure, the upper side part of the light guide plate or the diffusion plate (or the upper parts of both side parts) is fixed to the support part. Meanwhile, since the lower side part, and at least the vertical central parts and lower parts of the both side parts of the light guide plate or the diffusion plate are not fixed to the support part, at least portions below the vertical central parts of the light guide plate or the diffusion plate are easily extended or contracted due to thermal expansion.

According to the light source device and the display apparatus of the present disclosure, when a lower part of the apparatus has a relatively large spatial margin, and an upper part of the apparatus has a relatively small spatial margin, a peripheral edge upper part of the optical member is fixed to the support part, and a peripheral edge lower part thereof is not fixed. In addition, a void in which the thermally expanded optical member enters is provided in a lower side of the optical member (that is, the lower part of the apparatus having a relatively large spatial margin). As a result, as compared to a case of providing the void in which the thermally expanded optical member enters in an upper side of the optical member (that is, the upper part of the apparatus having a relatively small spatial margin), the light source device, and the display apparatus including the light source device may be reduced in a size thereof.

The above and further objects and features will more fully be apparent from the following detailed description with accompanying drawings.

DETAILED DESCRIPTION

Figure 1:
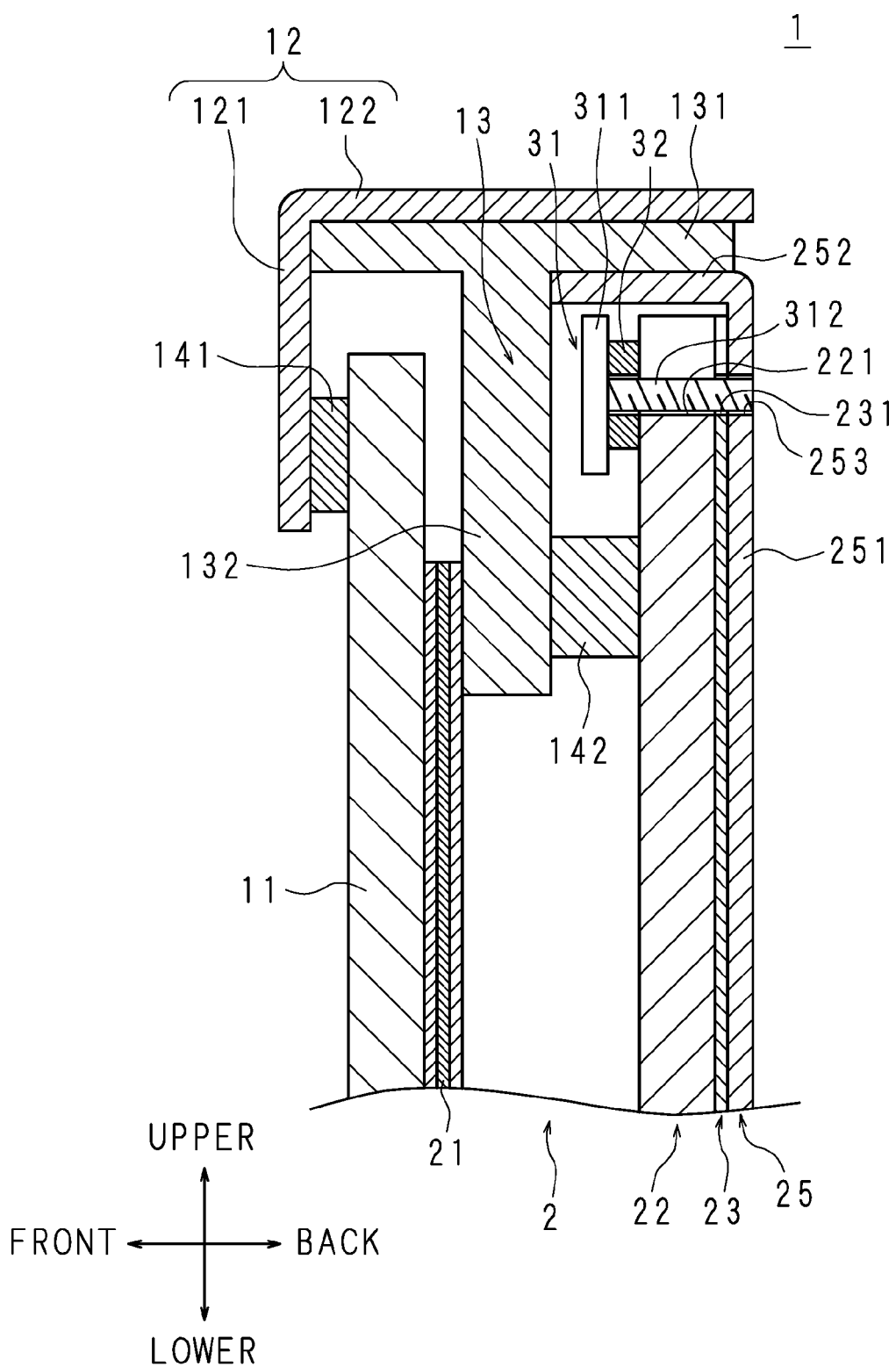
FIG. 1 is a cross-sectional view schematically illustrating a configuration of an upper side of a display apparatus including a light source device according to Embodiment 1 of the present disclosure.

The present disclosure will be described below in detail with reference to the drawings illustrating the embodiments thereof. In the following description, upper, lower, front, back, left and right are used as indicated by the arrows in the drawings.

Embodiment 1

Figure 2:
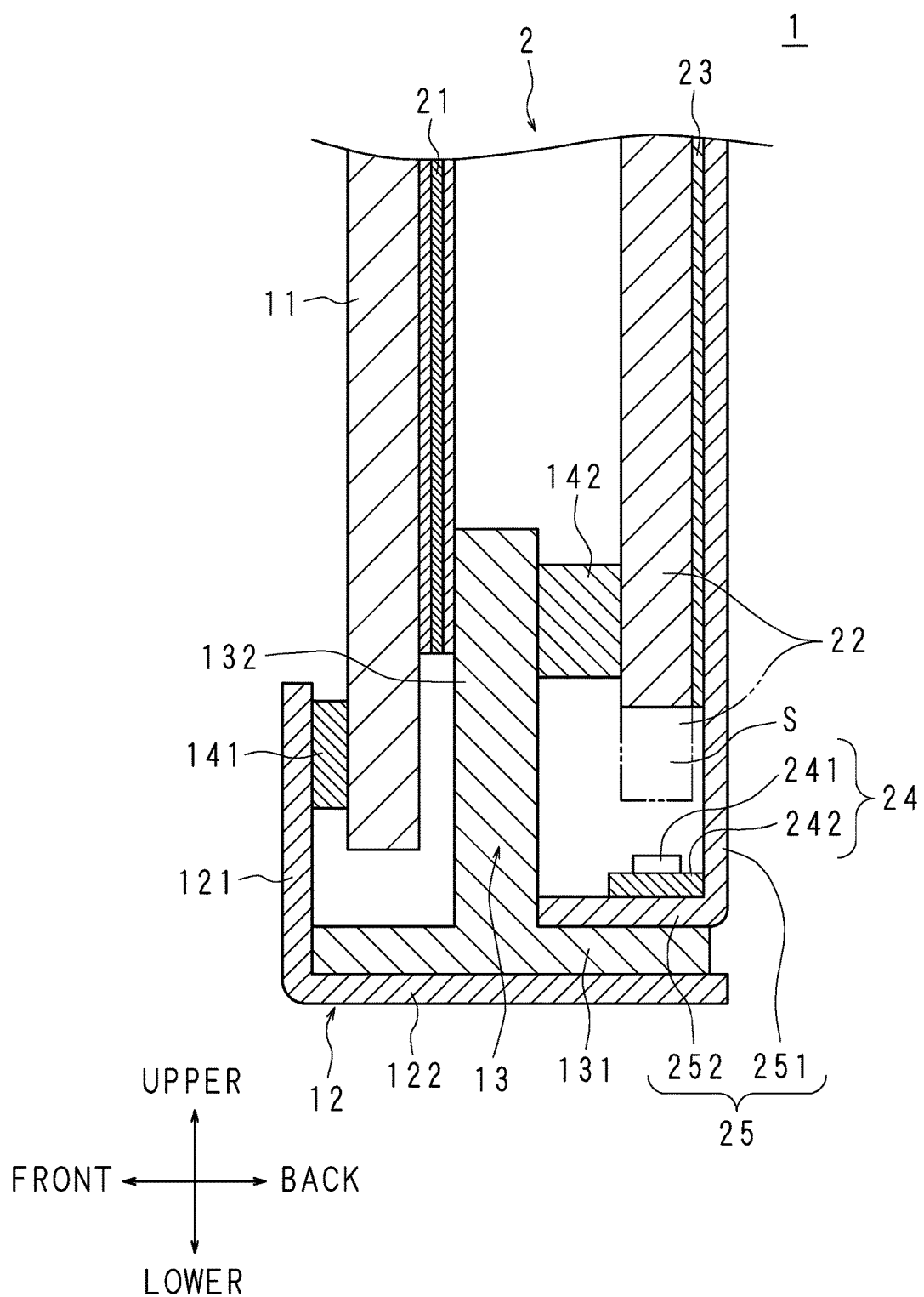
FIG. 2 is a cross-sectional view schematically illustrating a configuration of a lower side of the display apparatus.

FIGS. 1 and 2 are cross-sectional views schematically illustrating configurations of upper and lower sides of a display apparatus 1 including a light source device 2 according to Embodiment 1 of the present disclosure.

Figure 3:
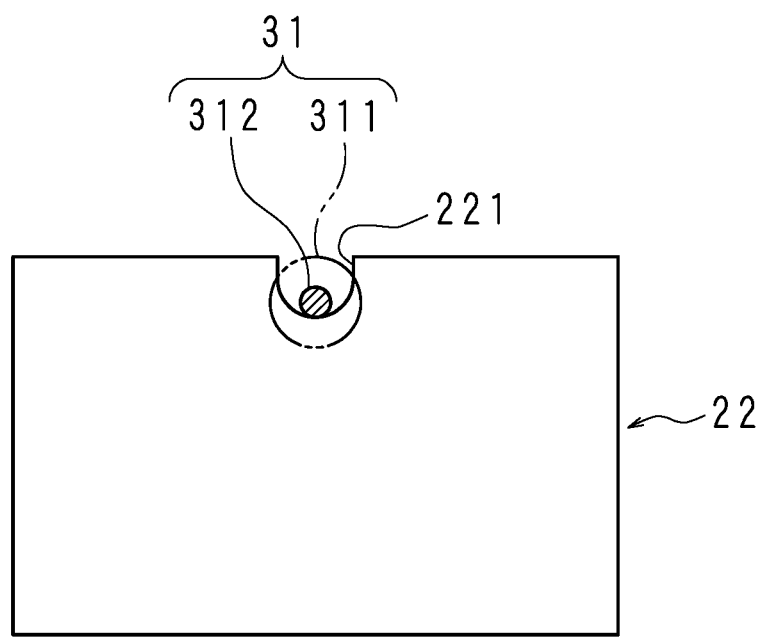
FIG. 3 is a front view schematically illustrating a configuration of a light guide plate included in the light source device.
Figure 3:
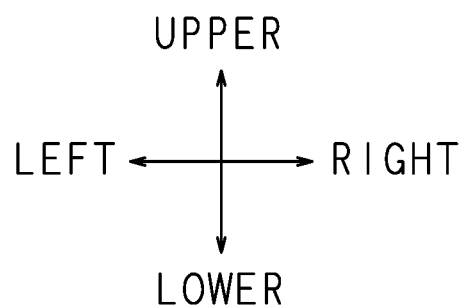

FIG. 3 is a front view schematically illustrating a configuration of a light guide plate 22 included in the light source device 2.

The display apparatus 1 of the present embodiment is formed as, for example, a television receiving apparatus, a digital signage, or a monitor for a personal computer.

First, each part of the display apparatus 1 will be described.

The display apparatus 1 includes a display panel 11, a bezel 12, a P chassis 13, buffer members 141 and 142, the light source device 2, a cabinet (not illustrated) and the like.

The light source device 2 includes an optical sheet group 21, the light guide plate 22 (optical member), a reflection sheet 23, a light source 24, a BL chassis 25 (support part), a screw 31, and a buffer part 32.

The display panel 11 is formed using a liquid crystal display panel. The display panel 11 is formed in a rectangular shape, and is arranged in a vertical position. The display panel 11 has a rectangular display region and a rectangular frame-shaped frame region which surrounds the display region. The display panel 11 has a glass substrate on a front side and a glass substrate on a back side. Liquid crystal is sealed between the two glass substrates. Light transmittance of the display panel 11 is changed depending on a voltage applied to the liquid crystal of the display panel 11.

The bezel 12 has a front face part 121 and a side face part 122 integrally formed therewith.

The front face part 121 is a rectangular frame shape, and covers the frame region of the display panel 11 from the front side, while exposing the display region of the display panel 11 through an opening of the rectangular frame. The rectangular frame-shaped buffer member 141 is arranged between the front face part 121 and the frame region of the display panel 11.

The side face part 122 protrudes backward from an outer peripheral edge part of the front face part 121.

The optical sheet group 21 is formed by laminating a plurality of optical sheets each of which is formed in a rectangular shape. Each optical sheet included in the optical sheet group 21 has a light diffusion function, a light collection function or the like. A front surface of the optical sheet group 21 is disposed to face a rear surface of the display panel 11. The optical sheet group 21 covers the display region of the display panel 11 at a back side of the display panel 11.

The P chassis 13 is arranged on the back side from the front face part 121 of the bezel 12, and on an inside from the side face part 122. The P chassis 13 has a base part 131 and a support frame part 132 integrally formed therewith.

The base part 131 is a longitudinal rectangular cylinder shape, covered with the side face part 122 of the bezel 12 from an outside. A front portion of the base part 131 covers respective peripheral edge end faces of the display panel 11 and the optical sheet group 21.

The support frame part 132 is a rectangular frame shape, and disposed to face the front face part 121 of the bezel 12, the frame region of the display panel 11, and a peripheral edge part of the optical sheet group 21 from the back side. In the present embodiment, the display panel 11 and the optical sheet group 21 are held between the front face part 121 of the bezel 12 and the support frame part 132 through the buffer member 141. The support frame part 132 protrudes inward from a longitudinal central part of the base part 131.

The light guide plate 22 is formed in a rectangular plate shape. The light guide plate 22 is made using, for example, an acrylic resin, and is likely to be thermally expanded. A front face of the peripheral edge part of the light guide plate 22 is disposed to face the support frame part 132 of the P chassis 13 from the back side. A central part in a plane direction of the light guide plate 22 is disposed to face the display region of the display panel 11 and a central part in a plane direction of the optical sheet group 21 from the back side through the opening of the rectangular frame in the support frame part 132 of the P chassis 13.

The rectangular frame-shaped buffer member 142 is arranged between the front face of the peripheral edge part of the light guide plate 22 and the support frame part 132 of the P chassis 13.

A horizontal central part in an upper side part of the light guide plate 22 is provided with a notch-shaped concave part 221. The concave part 221 is formed in a U shape in a front view.

The light guide plate 22 is configured so that light made incident inside of the light guide plate 22 is emitted from a front surface of the light guide plate 22. For this purpose, the light guide plate 22 is provided with a plurality of reflection parts (not illustrated) on a rear surface thereof. The light made incident on the reflection parts is reflected to the front side.

The reflection sheet 23 is a rectangular shape. A front surface of the reflection sheet 23 is disposed in close contact with the rear surface of the light guide plate 22. Accordingly, the light emitted from the rear surface of the light guide plate 22 is reflected by the reflection sheet 23 to be again made incident on an inner surface of the light guide plate 22.

A horizontal central part in an upper side part of the reflection sheet 23 is provided with a notch-shaped concave part 231 of a U shape in a front view. The concave part 231 faces toward the concave part 221 of the light guide plate 22. Shapes of the concave parts 221 and 231 of the light guide plate 22 and the reflection sheet 23 are congruent with each other in a front view.

The BL chassis 25 is formed in a dish shape. The BL chassis 25 has a rear face part 251 corresponding to a bottom surface of the dish, and a side face part 252 corresponding to a peripheral surface of the dish.

The side face part 252 is covered with a rear part of the base part 131 of the P chassis 13 from the outside. The side face part 252 covers the respective peripheral edge end faces of the light guide plate 22 and the reflection sheet 23.

The rear face part 251 is disposed to face the light guide plate 22 and the reflection sheet 23 from the back side. The light guide plate 22 and the reflection sheet 23 are held between the rear face part 251 and the support frame part 132 of the P chassis 13 through the buffer member 142.

Holding by the P chassis 13 and the BL chassis 25 is to suppress an occurrence of an unwanted void (further, light leakage through this unwanted void) between the light guide plate 22 and the support frame part 132 of the P chassis 13, or between the light guide plate 22 and the reflection sheet 23, and is not to fix the light guide plate 22 and the reflection sheet 23 to the P chassis 13 and the BL chassis 25. Therefore, by the above-described holding, thermal expansion of the light guide plate 22, or a restoration from the thermal expansion is not hindered.

The BL chassis 25 (rear face part 251 in the present embodiment) is provided with a screw hole 253 having a female thread. The screw hole 253 faces toward the concave parts 221 and 231 of the light guide plate 22 and reflection sheet 23.

The buffer part 32 is a disk-shaped elastic member provided with a through hole in the central part thereof. An outer diameter (and an inner diameter) of the buffer part 32 is longer (and shorter) than a dimension of a horizontal opening relating to the concave part 221 of the light guide plate 22. A radius of the outer diameter of the buffer part 32 is shorter than the dimension of a vertical opening relating to the concave part 221 of the light guide plate 22.

The screw 31 has a head part 311 and a shank part 312 integrally formed therewith.

A radius of the head part 311 is shorter than the dimension of the horizontal opening relating to the concave part 221 of the light guide plate 22.

The shank part 312 has a male thread corresponding to the female thread of the screw hole 253 of the BL chassis 25. The shank part 312, in a state of penetrating the through hole of the buffer part 32, is inserted into the concave parts 221 and 231 of the light guide plate 22 and reflection sheet 23 in this order from the front side, and further is inserted into the screw hole 253 from the front side to be screwed thereto. In this case, a part of the peripheral surface of the shank part 312 is disposed in contact with or close to lowermost portions of inner surfaces of the concave parts 221 and 231.

As a result, the light guide plate 22 and the reflection sheet 23 are held between the head part 311 and the BL chassis 25 through the buffer part 32. In this case, the head part 311 and the buffer part 32 do not protrude to the upper side from an upper end face of the light guide plate 22.

Holding by the screw 31 and the BL chassis 25 is to fix respective peripheral edge upper parts (one portion of the peripheral edge part) of the light guide plate 22 and the reflection sheet 23 to the BL chassis 25. Specifically, the respective upper side parts of the light guide plate 22 and the reflection sheet 23 are fixed to the BL chassis 25. Therefore, it is difficult for the light guide plate 22 to be thermally expanded toward the upper side. The reason is that, even when the light guide plate 22 trying to be thermally expanded toward the upper side, the inner surface of the concave part 221 of the light guide plate 22 abuts the shank part 312 of the screw 31.

Meanwhile, respective peripheral edge lower parts (the other portion of the peripheral edge part) of the light guide plate 22 and the reflection sheet 23 are not fixed to the BL chassis 25. Specifically, respective lower side parts and right and left side parts (both side parts) of the light guide plate 22 and the reflection sheet 23 are not fixed to other members including the BL chassis 25. Therefore, the light guide plate 22 may be easily thermally expanded toward the lower side and the right and left sides or restored from the thermal expansion.

Briefly, so to speak, the light guide plate 22 and the reflection sheet 23 are suspended (hung) from the BL chassis 25, due to the upper side parts thereof held by the screw 31 and the BL chassis 25.

From the above description, the light guide plate 22 is likely to be thermally expanded mainly toward the lower side.

The light source 24 is arranged below the light guide plate 22, and is supported by the BL chassis 25 through a heatsink (not illustrated).

The light source 24 includes a plurality of LEDs 241, 241 and . . . , and an LED substrate 242.

The LED substrate 242 is formed in a laterally long rectangular shape in a horizontal position. An upper surface of the LED substrate 242 is disposed to face the lower end face of the light guide plate 22.

The LEDs 241, 241 and . . . are equidistantly mounted on the upper surface of the LED substrate 242 in a row in the horizontal direction. The LEDs 241, 241 and . . . , and the lower end face of the light guide plate 22 are disposed to face each other with being spaced at an appropriate length.

A void S between the LEDs 241, 241 and . . . and the light guide plate 22 which is not yet thermally expanded serves as a void to allow entry of the lower side part (illustrated in FIG. 2 by a dashed-two dotted line) of the thermally expanded light guide plate 22.

Further, the light source device 2 may be provided with two light sources instead of the light source 24. In this case, the two light sources are arranged at upper and lower parts of the light guide plate 22 one by one.

Alternately, one light source (or two light sources) may be arranged at any one of right and left parts (or at both parts one by one) of the light guide plate 22.

The above-described cabinet houses the display panel 11, the bezel 12, the P chassis 13, the buffer members 141 and 142, and the light source device 2, while exposing the display region of the display panel 11.

However, a lower side of the bezel 12 inside of the cabinet has a reception substrate housed therein to receive a signal transmitted from a remote controller (each of which is not illustrated). In addition, a logo of a manufacturer or a product name (not illustrated), etc. is described just below of the display region of the display panel 11 in a front lower part of the cabinet. Further, speakers (not illustrated) are arranged in the lower part of the cabinet. From the above description, the lower side of the display apparatus 1 has a spatial margin which is more than the upper side thereof. Briefly, providing the void S to allow entry of the thermally expanded light guide plate 22 in the lower side of the light guide plate 22 may more reduce a restriction to a design than the upper side thereof.

In other words, the display apparatus 1 in which the void S is provided in the lower side of the light guide plate 22 may be more easily reduced in a size thereof than a case of providing the void S in the upper side of the light guide plate 22.

Next, illumination of the display panel 11 by the light source device 2 will be described.

Light emitted by the light source 24 is made incident inside of the light guide plate 22 from the lower end face of the light guide plate 22.

A part of the light made incident inside of the light guide plate 22 is reflected by the front surface, the rear surface, or the reflection parts of the light guide plate 22, and finally, is emitted to the optical sheet group 21 from the front surface. The other part of the light made incident inside of the light guide plate 22 is emitted from the rear surface of the light guide plate 22, and is reflected by the reflection sheet 23 to be again made incident inside of the light guide plate 22.

The light emitted to the optical sheet group 21 is made incident inside of the display panel 11 from the rear surface of the display panel 11 through diffusion, light collection, or the like by the optical sheet group 21.

As described above, the display panel 11 is illuminated by the light source device 2 from the back side. The light made incident inside of the display panel 11 is transmitted through the display panel 11, or is blocked from passing through the display panel 11. As a result, an image is displayed on the display region of the display panel 11.

Since the light guide plate 22 is held between the screw 31 and the BL chassis 25, the above-described display apparatus 1 has a simple configuration.

In addition, since the head part 311 of the screw 31 or the buffer part 32 does not protrude to the upper side from the upper end face of the light guide plate 22, it is not necessary to provide an unwanted void to allow an arrangement of the head part 311 of the screw 31 or the buffer part 32 in the upper side of the light guide plate 22.

Further, instead of the screw 31, for example, the light guide plate 22 may be held between a rivet and the BL chassis 25. However, since the screw 31 is easily removed compared to the rivet, for example, the screw 31 allows for a simple disassembling of the display apparatus 1 during recycling the same.

In addition, instead of holding by the screw 31 and the BL chassis 25, the upper side part of the light guide plate 22 may be adhered to the BL chassis 25. In this case, it is not necessary to provide the concave part 221 in the light guide plate 22. However, the light guide plate 22 is relatively heavy among the components forming the display apparatus 1. Therefore, preparing an adhesive or an adhesive member capable of adhering and fixing the light guide plate 22 to the BL chassis 25 is not easy, as compared to preparing the screw 31.

Further, instead of holding by the screw 31 and the BL chassis 25, the upper side part of the light guide plate 22 may be held and fixed by a clip-shaped holding member from the upper side, and the holding member may be fixed to the BL chassis 25. However, since it is necessary to provide a space for disposing the holding member in the upper side of the light guide plate 22, a reduction in a size of the display apparatus 1 may become more difficult than the case of holding by the screw 31 and the BL chassis 25.

The concave part 221 of the light guide plate 22 is not limited to the U shape, and may be a V shape, a channel shape or the like.

In addition, a support part to fix the light guide plate 22 is not limited to the BL chassis 25, and for example, it may be the P chassis 13 (support frame part 132).

In this regard, holding by the screw 31 and the BL chassis 25 may be obtained without the need to pass through the buffer part 32.

However, when the buffer part 32 is not present, the head part 311 of the screw 31 directly contacts to the front surface in the peripheral surface of the concave part 221 of the light guide plate 22.

Accordingly, by strongly screwing the screw 31, a large external force is unnecessarily intensively applied to the light guide plate 22 from the head part 311 of the screw 31, and damage, distortion, or the like may occur in the light guide plate 22. However, if screwing of the screw 31 is weak, holding by the screw 31 and the BL chassis 25 (that is, fixing of the light guide plate 22) becomes incomplete, such that positional shift, dropout, or the like of the light guide plate 22 may occur.

Further, due to the thermal expansion/restoration, vibration, or the like of the light guide plate 22, the light guide plate 22 and the head part 311 of the screw 31 may strongly abut each other. In this case, damage of the light guide plate 22, and further, an occurrence of fragments caused by the damage of the light guide plate 22 may occur.

Briefly, it is advantageous that holding by the screw 31 and the BL chassis 25 is performed through the buffer part 32. The reason is that, even if strongly screwing the screw 31, the buffer part 32 suppresses an unwanted external force from being intensively applied to the light guide plate 22 from the head part 311 of the screw 31. In addition, the buffer part 32 prevents the head part 311 of the screw 31 and the light guide plate 22 from directly contacting with each other.

Further, in the display apparatus 1, when the upper part of the apparatus has a relatively large spatial margin, and the lower part of the apparatus has a relatively small spatial margin, the light source device 2 may be configured in such a manner that the lower side part of the light guide plate 22 is fixed to the BL chassis 25, while the upper side part is not fixed.

Furthermore, in the display apparatus 1, for example, when the right part of the apparatus has a relatively large spatial margin, and the left part of the apparatus has a relatively small spatial margin, the light source device 2 may be configured in such a manner that the left side part of the light guide plate 22 is fixed to the BL chassis 25, while the right side part is not fixed.

Embodiment 2

Figure 4:
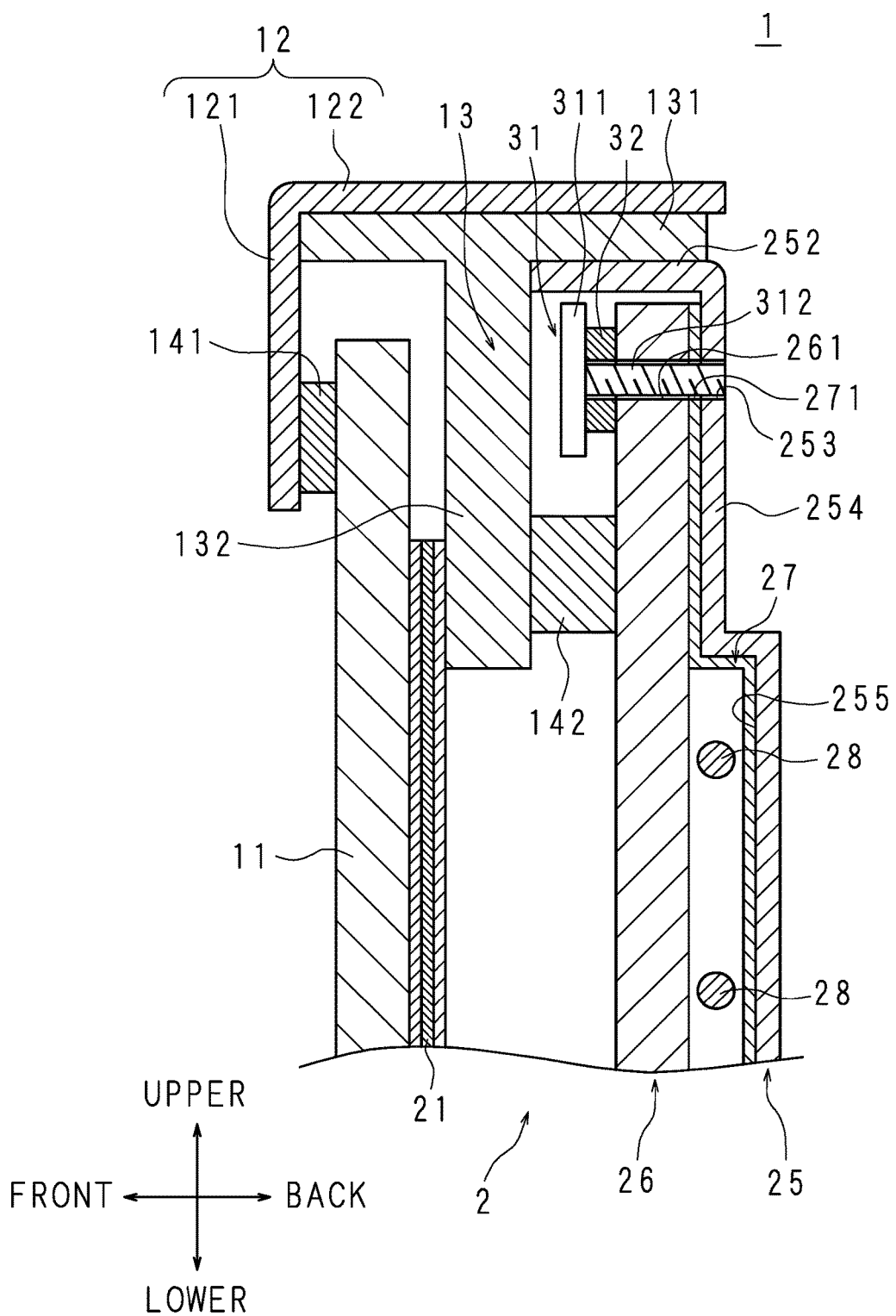
FIG. 4 is a cross-sectional view schematically illustrating a configuration of a display apparatus including a light source device according to Embodiment 2 of the present disclosure.

FIG. 4 is a cross-sectional view schematically illustrating a configuration of a display apparatus 1 including a light source device 2 according to Embodiment 2 of the present disclosure.

Figure 5:
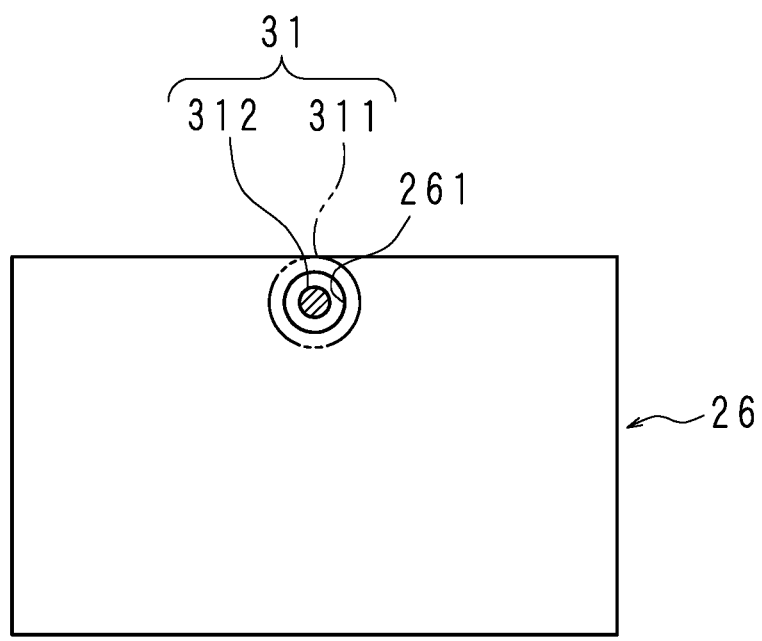
FIG. 5 is a front view schematically illustrating a configuration of a diffusion plate included in the light source device.
Figure 5:
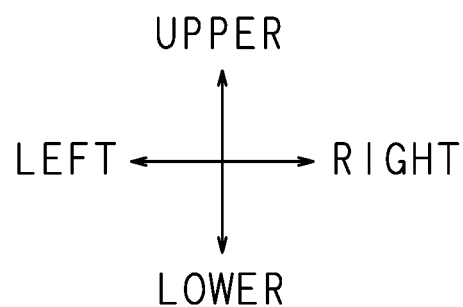

FIG. 5 is a front view schematically illustrating a configuration of a diffusion plate 26 included in the light source device 2.

FIGS. 4 and 5 correspond to FIGS. 1 and 3 of Embodiment 1.

The light source device 2 of the present embodiment has substantially the same configuration as the light source device 2 of Embodiment 1. Hereinafter, a difference from Embodiment 1 will be described, and other parts corresponding to Embodiment 1 have the same reference numbers, and will not be described.

The light source device 2 of the present embodiment includes a diffusion plate 26, a reflection sheet 27, and a plurality of light sources 28, 28 and . . . , instead of the light guide plate 22, the reflection sheet 23, and the light source 24 of Embodiment 1.

The diffusion plate 26 is a rectangular plate-shaped optical member made of a material which is likely to be thermally expanded. A front face of the peripheral edge part of the diffusion plate 26 is disposed to face the support frame part 132 of the P chassis 13 from the back side. A central part in a plane direction of the diffusion plate 26 is disposed to face the display region of the display panel 11 and the central part in a plane direction of the optical sheet group 21 from the back side, through the opening of a rectangular frame in the support frame part 132 of the P chassis 13.

The rectangular frame-shaped buffer member 142 is arranged between the front face of the peripheral edge part of the diffusion plate 26 and the support frame part 132 of the P chassis 13.

A horizontal central part in an upper side part of the diffusion plate 26 is provided with a circular through hole 261 in a front view. An inner diameter of the through hole 261 is smaller than an outer diameter of the head part 311 of the screw 31, is larger than a maximum diameter of the shank part 312, and is the same level as an inner diameter of the through hole of the buffer part 32. The through hole 261 corresponds to the concave part 221 of the light guide plate 22 of Embodiment 1.

The reflection sheet 27 is provided with a circular through hole 271 in a front view. An inner diameter of the through hole 271 is the same as the inner diameter of the through hole 261 of the diffusion plate 26. The through hole 271 corresponds to the concave part 231 of the reflection sheet 23 of Embodiment 1.

Each light source 28 is formed using a fluorescent tube arranged in a horizontal direction to face the back surface of the diffusion plate 26. The light sources 28, 28 and . . . are juxtaposed at an appropriate length in a vertical direction.

In addition, the BL chassis 25 of the present embodiment has a rear face part 254, instead of the rear face part 251 of Embodiment 1.

The rear face part 254 is provided with a concave part 255 recessed to the back side. The light sources 28, 28 and . . . are housed inside of the concave part 255. A front surface of the rear face part 251 including an inner surface of the concave part 255 is covered with the reflection sheet 27.

The diffusion plate 26 and the reflection sheet 27 are held between the rear face part 254 and the support frame part 132 of the P chassis 13 through the buffer member 142. By the above-described holding, thermal expansion of the diffusion plate 26, or a restoration from the thermal expansion is not hindered.

The BL chassis 25 (rear face part 254 in the present embodiment) is provided with the screw hole 253. The screw hole 253 faces toward the through holes 261 and 271 of the diffusion plate 26 and the reflection sheet 27.

In a state of penetrating the through hole of the buffer part 32, the shank part 312 of the screw 31 is inserted into the through holes 261 and 271 of the diffusion plate 26 and the reflection sheet 27 in this order from the front side, and further is inserted into the screw hole 253 from the front side to be screwed thereto.

As a result, the diffusion plate 26 and the reflection sheet 27 are held between the head part 311 and the BL chassis 25 through the buffer part 32. In this case, the head part 311 and the buffer part 32 do not protrude to the upper side from the upper end face of the diffusion plate 26.

Holding by the screw 31 and the BL chassis 25 is to fix the respective upper side parts of the diffusion plate 26 and the reflection sheet 27 to the BL chassis 25. Specifically, the respective upper side parts of the diffusion plate 26 and the reflection sheet 27 are fixed to the BL chassis 25. Therefore, it is difficult for the diffusion plate 26 to be thermally expanded toward the upper side. The reason is that, even when the diffusion plate 26 trying to be thermally expanded toward the upper side, the inner surface of the through hole 261 of the diffusion plate 26 abuts the shank part 312 of the screw 31.

Meanwhile, the respective lower side parts and the right and left side parts of the diffusion plate 26 and the reflection sheet 27 are not fixed to other members including the BL chassis 25. Therefore, the diffusion plate 26 may be easily thermally expanded toward the lower side and the right and left sides, or restored from the thermal expansion.

Briefly, so to speak, the diffusion plate 26 and the reflection sheet 27 are suspended (hung) from the BL chassis 25, due to the upper side parts thereof held by the screw 31 and the BL chassis 25.

From the above description, the diffusion plate 26 is likely to be thermally expanded mainly toward the lower side. Accordingly, a void to allow entry of the thermally expanded diffusion plate 26 (which corresponds to the void S of Embodiment 1) is provided in the lower side of the diffusion plate 26.

Therefore, the display apparatus 1 of the present embodiment may be easily reduced in a size thereof, similar to the display apparatus 1 of Embodiment 1.

Next, illumination of the display panel 11 by the light source device 2 will be described.

Light emitted by the light sources 28, 28 and . . . is made incident inside of the diffusion plate 26 from the rear surface of the diffusion plate 26 directly or by being reflected by the reflection sheet 27. The light made incident inside of the diffusion plate 26 is diffused, and is emitted to the optical sheet group 21 from the front surface of the diffusion plate 26.

The light emitted to the optical sheet group 21 is made incident inside of the display panel 11 from the rear surface of the display panel 11 through diffusion, light collection, or the like by the optical sheet group 21.

As described above, the display panel 11 is illuminated by the light source device 2 from the back side.

Since the diffusion plate 26 is held between the screw 31 and the BL chassis 25, the above-described display apparatus 1 has a simple configuration.

In addition, since the head part 311 of the screw 31 or the buffer part 32 does not protrude to the upper side from the upper end face of the diffusion plate 26, it is not necessary to provide an unwanted void to allow an arrangement of the head part 311 of the screw 31 or the buffer part 32 in the upper side of the diffusion plate 26.

Further, if the shank part 312 of the screw 31 is inserted into the through holes 261 and 271 of the diffusion plate 26 and the reflection sheet 27, the diffusion plate 26 and the reflection sheet 27 are positioned, such that, in particular, when attaching the diffusion plate 26 and the reflection sheet 27 to the BL chassis 25, the positional shift or dropout of the diffusion plate 26 and the reflection sheet 27 is suppressed. That is, assemblability of the light source device 2 is improved.

Furthermore, the diffusion plate 26 and the reflection sheet 27 may be provided with concave parts corresponding to the concave parts 221 and 231 of Embodiment 1, instead of the through holes 261 and 271. In addition, the light guide plate 22 and the reflection sheet 23 of Embodiment 1 may be provided with through holes corresponding to the through holes 261 and 271 of the present embodiment.

A shape of the through hole 261 it is not limited to the circle, and may be ellipse, a polygon or the like.

In addition, by increasing an inner diameter of a front part of the through hole 261 more than the outer diameter of the buffer part 32, the through hole 261 may be provided with a step part therein. In this case, the buffer part 32 contacts to an inner surface of the step part of the through hole 261. At this time, the buffer part 32 (or the buffer part 32 and the head part of the screw 31) may be housed inside of the through hole 261.

Embodiment 3

Figure 6:
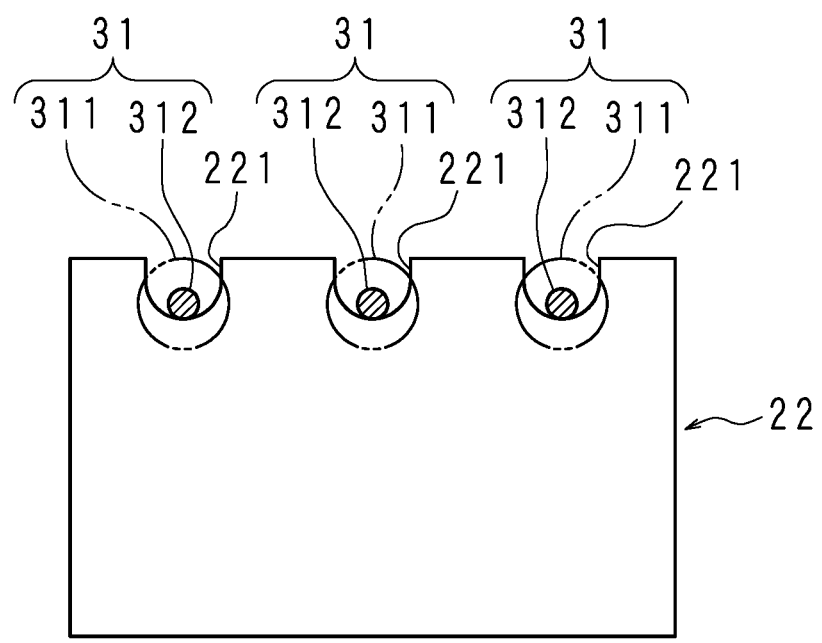
FIG. 6 is a front view schematically illustrating a configuration of a light guide plate included in a light source device according to Embodiment 3 of the present disclosure.
Figure 6:
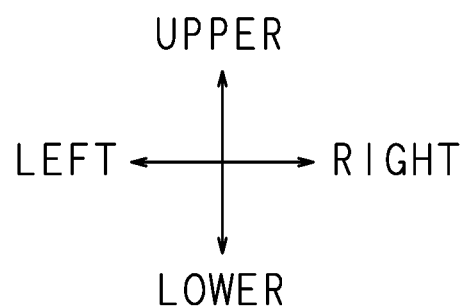

FIG. 6 is a front view schematically illustrating a configuration of a light guide plate 22 included in a light source device 2 according to Embodiment 3 of the present disclosure. FIG. 6 corresponds to FIG. 3 of Embodiment 1.

The light source device 2 of the present embodiment has substantially the same configuration as the light source device 2 of Embodiment 1. Hereinafter, a difference from Embodiment 1 will be described, and other parts corresponding to Embodiment 1 have the same reference numbers, and will not be described.

The light guide plate 22 of the present embodiment has N (N is a natural number of N≥2) concave parts 221, 221 and . . . which are arranged at an upper side part thereof in the horizontal direction. Similarly, the reflection sheet 23 has N concave parts 231, 231 and . . . corresponding to the concave parts 221, 221 and . . . of the light guide plate 22, which are arranged at an upper side part thereof in the horizontal direction.

Therefore, the BL chassis 25 is provided with N screw holes 253, 253 and . . . corresponding to the concave parts 221, 221 and . . . of the light guide plate 22.

The respective upper side parts of the light guide plate 22 and the reflection sheet 23 are fixed to the BL chassis 25 using each of N screws 31, 31 and . . . , and buffer parts 32, 32 and . . . . As a result, the light guide plate 22 and the reflection sheet 23 are suspended (hung) from the BL chassis 25.

From the above description, the light guide plate 22 is likely to be thermally expanded mainly toward the lower side.

Accordingly, the void S to allow entry of the thermally expanded light guide plate 22 is provided in the lower side of the light guide plate 22.

Therefore, the display apparatus 1 of the present embodiment may be easily reduced in a size thereof, similar to the display apparatus 1 of Embodiment 1.

Further, the light guide plate 22 may be provided with each of L shape notch-shaped concave parts 221 and 221 in right and left corner parts of the upper side part thereof.

In addition, the light guide plate 22 may be provided with N through holes, instead of the N concave parts 221, 221 and . . . formed therein.

Embodiment 4

Figure 7:
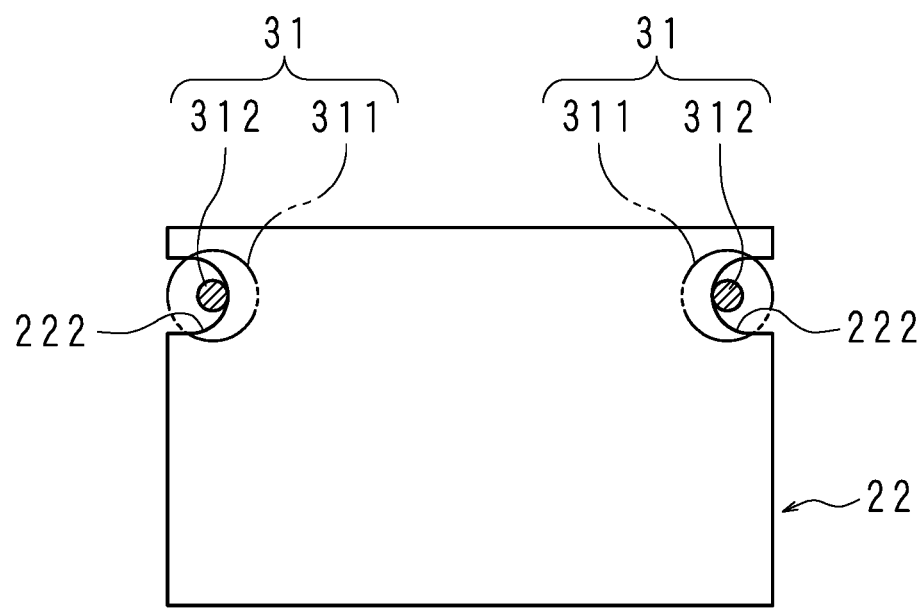
FIG. 7 is a front view schematically illustrating a configuration of a light guide plate included in a light source device according to Embodiment 4 of the present disclosure.
Figure 7:
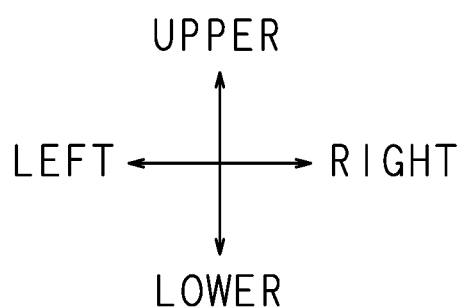

FIG. 7 is a front view schematically illustrating a configuration of a light guide plate 22 included in a light source device 2 according to Embodiment 4 of the present disclosure. FIG. 7 corresponds to FIG. 3 of Embodiment 1.

The light source device 2 of the present embodiment has substantially the same configuration as the light source device 2 of Embodiment 1. Hereinafter, a difference from Embodiment 1 will be described, and other parts corresponding to Embodiment 1 have the same reference numbers, and will not be described.

The light guide plate 22 of the present embodiment is not provided with the concave part 221, and is provided with each one of concave parts 222 and 222 near the upper side part in the right and left side parts of the light guide plate 22.

Each concave part 222 is a U-shaped notch shape in a front view. A spaced distance of the concave part 222 from the upper end face of the light guide plate 22 is ⅓ or less (preferably, 1/10 or less) of a length of the right side part or left side part of the light guide plate 22. Briefly, the concave parts 222 and 222 are provided at the upper parts of the right and left side parts, and are not provided at the lower side part, and the vertical central parts and lower parts of the right and left side parts.

Similarly, the reflection sheet 23 is provided with each one of concave parts (not illustrated) corresponding to the concave parts 222 and 222 of the light guide plate 22 at the upper parts of the right and left side parts thereof.

Therefore, the BL chassis 25 is provided with two screw holes 253 and 253 corresponding to the concave parts 222 and 222 of the light guide plate 22.

The respective upper side parts of the right and left side parts of the light guide plate 22 and the reflection sheet 23 are fixed to the BL chassis 25 using each one of screws 31 and 32 and buffer parts 32 and 32. Meanwhile, the respective lower side parts, and the vertical central parts and lower parts of the right and left side parts of the light guide plate 22 and the reflection sheet 23 are not fixed to other members including the BL chassis 25. As a result, the light guide plate 22 and the reflection sheet 23 are suspended (hung) from the BL chassis 25.

From the above description, the light guide plate 22 is likely to be thermally expanded mainly toward the lower side. Accordingly, the void S to allow entry of the thermally expanded light guide plate 22 is provided in the lower side of the light guide plate 22.

Therefore, the display apparatus 1 of the present embodiment may be easily reduced in a size thereof, similar to the display apparatus 1 of Embodiment 1.

The light source device 2 of the present embodiment is preferable when forming of the concave part 221 with respect to the upper side part of the light guide plate 22 such as Embodiment 1, screwing of the upper side part of the light guide plate 22 using the concave part 221, or the like is difficult in terms of design or production.

In addition, if the shank parts 312 and 312 of two screws 31 and 32 are inserted into the concave parts 222 and 222 of the light guide plate 22 and two concave parts of the reflection sheet 23, by engaging of the shank parts 312 and 312 with the concave parts 222 and 222 and two concave parts of the reflection sheet 23, the light guide plate 22 and the reflection sheet 23 are positioned. Accordingly, in particular, when attaching the light guide plate 22 and the reflection sheet 23 to the BL chassis 25, the positional shift or dropout of the light guide plate 22 and the reflection sheet 23 are suppressed. That is, assemblability of the light source device 2 is improved.

In a case of the light source device 2 of the present embodiment, the light guide plate 22 is likely to be thermally expanded toward the upper side, as compared to the case of Embodiment 1. However, since the upper parts of the right and left side parts of the light guide plate 22 are fixed to the BL chassis 25, and the lower side part, and the vertical central parts and lower parts of the right and left side parts are not fixed to the BL chassis 25, the thermal expansion of the light guide plate 22 toward the upper side thereof is smaller than the thermal expansion of the light guide plate 22 toward the lower side thereof. Therefore, the void S to be provided in the upper side of the light guide plate 22 may not be large enough to bring an increase in a size of the apparatus.

Further, the light guide plate 22 may be provided with two through holes, instead of two concave parts 222 and 222 formed therein.

The light source device according to the embodiments of the present disclosure is not limited to such the light source device 2 incorporated in the display apparatus 1. For example, the light source device may be configured as a backlight of the display unit provided in mobile phones, portable information communication terminals or the like. Alternately, the light source device may be configured as a ceiling light, a wall mounted illumination device or the like.

It should be understood that the embodiments disclosed herein are illustrative and non-restrictive in every respect. Since the scope of the present disclosure is defined by the appended claims rather than by the description preceding them, and all changes that fall within metes and bounds of the claims, or equivalence of such metes and bounds thereof are therefore intended to be embraced by the claims.

Moreover, as long as the effect of the present disclosure can be produced, the display apparatus 1 or the light source device 2 may include components not disclosed in Embodiments 1-4.

The components (technical features) disclosed in each example embodiment may be combined with one another, and such combinations may form new technical features.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A light source device comprising:
   a light source;
   a plate-shaped optical member configured to emit light emitted by the light source from one surface of the optical member; and
   a support part configured to support the optical member, wherein
   one portion of a peripheral edge part of the optical member is fixed to the support part,
   the other portion of the peripheral edge part of the optical member are not fixed to the support part,
   the optical member is a rectangular light guide plate or a diffusion plate arranged in a vertical position,
   an upper side part, or upper parts of right and left side parts of the optical member are fixed to the support part, and
   a lower side part, and at least vertical central parts and lower parts of the right and left side parts of the optical member are not fixed to the support part.

2. The light source device according to claim 1, wherein the support part is provided with a screw hole having a female thread,
   the one portion of the peripheral edge part is provided with a through hole or a notch-shaped concave part, and the light source device further includes a screw whose shank part having a male thread is inserted into the through hole or the concave part, such that the male thread and the female thread are screwed with each other to hold the optical member between a head part of the screw and the support part.

3. The light source device according to claim 2, wherein a buffer part is disposed between the head part and the optical member.

4. A display apparatus comprising:
the light source device according to claim 1, and
a display panel which is illuminated by the light source device from a back side of the display panel.

5. A light source device comprising:
a light source;
a plate-shaped optical member configured to emit light emitted by the light source from one surface of the optical member; and
a support part configured to support the optical member, wherein
one portion of a peripheral edge part of the optical member is fixed to the support part,
the other portion of the peripheral edge part of the optical member are not fixed to the support part,
the support part is provided with a screw hole having a female thread,
the one portion of the peripheral edge part is provided with a notch-shaped concave part, and
the light source device further includes a screw whose shank part having a male thread is inserted into the concave part, such that the male thread and the female thread are screwed with each other to hold the optical member between a head part of the screw and the support part.

6. The light source device according to claim 5, wherein a buffer part is disposed between the head part and the optical member.

7. A display apparatus comprising:
the light source device according to claim 5, and
a display panel which is illuminated by the light source device from a back side of the display panel.

* * * * *